United States Patent
Ruane et al.

(10) Patent No.: US 11,483,137 B2
(45) Date of Patent: Oct. 25, 2022

(54) DYNAMIC COMMAND EXTENSION FOR A MEMORY SUB-SYSTEM

(71) Applicant: Micron Technology, Inc., Boise, ID (US)

(72) Inventors: James Ruane, San Jose, CA (US); Robert W. Strong, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 315 days.

(21) Appl. No.: 16/749,558

(22) Filed: Jan. 22, 2020

(65) Prior Publication Data

US 2021/0226779 A1 Jul. 22, 2021

(51) Int. Cl.
*H04L 9/08* (2006.01)
*H04L 9/32* (2006.01)
*G06F 12/14* (2006.01)
*G06F 9/4401* (2018.01)
*G06F 21/78* (2013.01)
(Continued)

(52) U.S. Cl.
CPC .......... *H04L 9/0825* (2013.01); *G06F 9/321* (2013.01); *G06F 9/442* (2013.01); *G06F 12/0246* (2013.01); *G06F 12/1408* (2013.01); *G06F 21/78* (2013.01); *H04L 9/3247* (2013.01)

(58) Field of Classification Search
CPC ..... H04L 9/0825; H04L 9/3247; G06F 9/321; G06F 9/442; G06F 12/0246; G06F 12/1408; G06F 21/78
See application file for complete search history.

(56) References Cited

U.S. PATENT DOCUMENTS

| 9,148,413 B1* | 9/2015 | Marr | H04L 63/08 |
| 2007/0027627 A1* | 2/2007 | Lawrence | G01C 21/00 |
| | | | 701/469 |

(Continued)

FOREIGN PATENT DOCUMENTS

| KR | 20160013196 A * | 2/2016 | ............ H04W 12/06 |
| WO | 2004066091 | 8/2004 | |

(Continued)

OTHER PUBLICATIONS

Machine translation of KR 20160013196, Huxham Horatio et al. (Year: 2016).*

(Continued)

*Primary Examiner* — Shanto Abedin
(74) *Attorney, Agent, or Firm* — Schwegman Lundberg & Woessner, P.A.

(57) ABSTRACT

A processing device is configured to process an initial set of command types. A command extension module and a digital signature are received. The digital signature is generated based on the command extension module using a private key of a key pair. The command extension module, once installed by the processing device, enables the processing device to process a new command type that is not included in the initial set of command types. The digital signature is verified using a public key of the key pair. Based on a successful verification of the digital signature, the command extension module is temporarily installed by loading the command extension module in a volatile memory device.

20 Claims, 7 Drawing Sheets

(51) Int. Cl.
*G06F 9/32* (2018.01)
*G06F 12/02* (2006.01)

(56) References Cited

U.S. PATENT DOCUMENTS

| | | | | |
|---|---|---|---|---|
| 2008/0301440 | A1* | 12/2008 | Plouffe, Jr. | G06F 21/51 |
| | | | | 713/164 |
| 2013/0275391 | A1* | 10/2013 | Batwara | G06F 16/125 |
| | | | | 707/689 |
| 2015/0220319 | A1* | 8/2015 | Weiss | H04W 12/35 |
| | | | | 713/168 |
| 2015/0296025 | A1* | 10/2015 | Okabayashi | G06F 9/44526 |
| | | | | 709/201 |
| 2016/0246585 | A1 | 8/2016 | Li et al. | |
| 2016/0313990 | A1* | 10/2016 | Brown | G06F 8/61 |
| 2018/0276146 | A1* | 9/2018 | Dover | G06F 12/1466 |
| 2018/0364917 | A1* | 12/2018 | Ki | G06F 12/0246 |
| 2019/0042725 | A1* | 2/2019 | Ruan | G06F 8/654 |
| 2021/0182397 | A1* | 6/2021 | Karnik | G06F 21/566 |

FOREIGN PATENT DOCUMENTS

| | | |
|---|---|---|
| WO | 2018175909 | 9/2018 |
| WO | 2021150719 | 7/2021 |

OTHER PUBLICATIONS

"International Application Serial No. PCT US2021 014366, International Search Report dated May 20, 2021", 3 pgs.
"International Application Serial No. PCT US2021 014366, Written Opinion dated May 20, 2021", 4 pgs.

* cited by examiner

DYNAMIC COMMAND EXTENSION FOR A MEMORY SUB-SYSTEM

TECHNICAL FIELD

Embodiments of the disclosure relate generally to memory sub-systems and more specifically to dynamic extension of memory sub-system commands.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
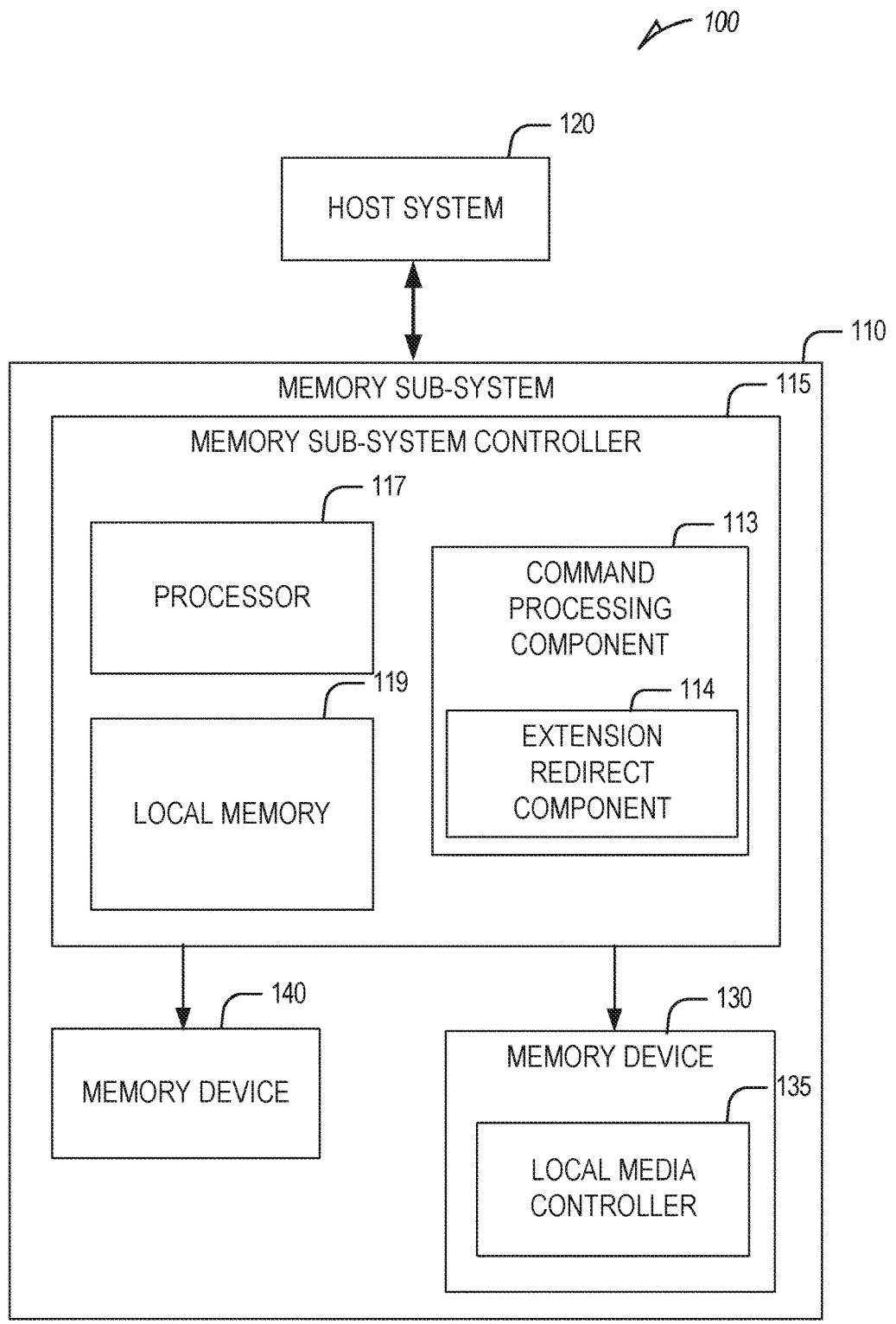
FIG. 1 illustrates an example computing environment that includes a memory sub-system, in accordance with some embodiments of the present disclosure.

Aspects of the present disclosure are directed to secure command extension in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system controller typically receives commands or operations from the host system and converts the commands or operations into instructions or appropriate commands to achieve desired access to memory components of the memory sub-system. Typically, a memory sub-system is initially configured with firmware capable of supporting a set of command types that enable certain functionality with respect to the memory sub-system. In some instances, these command types include vendor specific command types that enable functionality that may be specific to a vendor's system configurations or processes. However, each command type can provide an attack vector that can be exploited to gain unauthorized access to data stored by the memory sub-system. Further, certain vendor specific commands may create security vulnerabilities that may be exploited to gain unauthorized access.

Memory sub-system firmware is normally validated by the memory sub-system before being installed to ensure that the firmware originated from a trusted source. As an example, a public key of an asymmetric key pair may be provisioned to a memory sub-system by an original equipment manufacturer (OEM) prior to shipment while a corresponding private key is secured by a hardware security module (HSM) of a secure system (e.g., operated the OEM) that is external to and independent of the memory sub-system. Firmware is digitally signed by the private key to establish a root of trust and the corresponding public key is used by the memory sub-system to validate the digital signature before installation.

In some instances, it may be desired to extend the functionality of the memory sub-system beyond that enabled by the set of command types that the memory sub-system firmware is initially capable of supporting. That is, it may be desirable to enable a memory sub-system to process additional command types that were not included in the original set of command types that the original memory sub-system firmware is capable of processing. In an example, it may be desired to initially configure a memory sub-system without any vendor specific commands to reduce the attack vectors for the system and later add capability to the system to process vendor specific commands. As another example, it may be desired to temporarily provide certain functionality to debug the memory sub-system.

Conventional techniques for command extension in memory sub-systems require downloading an updated firmware file that includes functionality to handle the additional commands and the memory sub-system must also revalidate the updated firmware file before installing. An updated firmware file may, however, be large, and the download and revalidation may consume large amounts of time and memory resources.

Aspects of the present disclosure address the above and other issues with systems and methods for dynamic memory sub-system command extension. The command extension is dynamic in that functionality to process additional commands may be temporarily added to a memory sub-system without requiring an entirely new firmware package to be installed and without requiring the firmware to be reevaluated as with the conventional methods for command extension discussed above.

Consistent with some embodiments, a command processing component is capable of adding functionality to the memory sub-system to process command types that the memory sub-system is not initially capable of processing. To extend the commands of the memory sub-system, the host system may provide a command extension module to the memory sub-system rather than an entire firmware package that must also be reverified. Consistent with some embodiments, the command extension module itself may be subject to some form of access control to ensure secure access and prevent unauthorized access. For example, a command extension module may be password protected and the host system may be required to provide the password to be able to download the command extension module. The command extension module is provided with a digital signature that is verified by the command processing component before temporarily installing the command extension module on the controller. A command received by the command processing component that corresponds to a command type processed by the command extension module is forwarded to the command extension module and the command extension module processes the command. The command extension module is only temporarily installed in that it is loaded to a volatile memory device and as such is lost upon reboot of the system or expiration of a time to live (TTL) value associated with the command extension module.

The techniques for dynamic command extension described above reduce vulnerabilities in a memory sub-system by eliminating a need for firmware to process vendor specific command types or those whose need was not recognized at the time of creating the firmware. Moreover, such a manner of dynamic command extension allows for firmware to be able to process only a limited set of command types given that functionality to process additional claim types can be added at a later time. Reducing the number of command types also reduces the number of attack vectors that may be used to gain unauthorized access to memory sub-systems thereby providing an additional security benefit.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface. Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)). Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some example of non-volatile memory devices (e.g., memory device 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

A command processing component 113 of the controller 115 receives the commands sent by the host system 120 via the physical host interface. The command processing component 113 may be included in the controller 115 or any one or more of the memory devices 130 or 140. In some embodiments, the controller 115 includes at least a portion of the command processing component 113. For example, the controller 115 can include the processor 117 (processing device) configured to execute instructions stored in the local memory 119 for performing the operations described herein.

Initially the controller 115 may be configured (e.g., by manufacturer installed firmware) to be capable of processing only a limited set of command types that are previously determined, for example, by a manufacturer of the controller 115. The command processing component 113 of the controller is configured to allow for dynamic extension of commands. That is, the command processing component 113 is able to add functionality to the controller 115 to process additional command types. To extend the commands of the controller 115, the host system 120 provides a command extension module to the controller 115. The command extension module comprises a set of machine-readable instructions that, once installed, enable the controller 115 to process at least one new command type that is not included in the predetermined set of command types that the command processing component 113 has enabled the controller 115 to process. The command extension module is provided with a digital signature that is verified by the command processing component 113 before temporarily installing the command extension module on the controller 115. For example, the command processing component 113 may load the command extension module into a volatile memory device (e.g., the memory device 130). The installation of the command extension module is temporary in this way because the command extension module is lost upon a reboot of the memory sub-system 110. In some embodiments, the command extension module may be erased from memory based on expiration of a TTL value associated with the module.

If the command processing component 113 determines a command received from the host system 120 corresponds to a command type that the installed command extension module is configured to process, an extension redirect component 114 of the command processing component 113 redirects (forwards) the command to the command extension module and the command extension module processes the command accordingly.

Figure 2A:
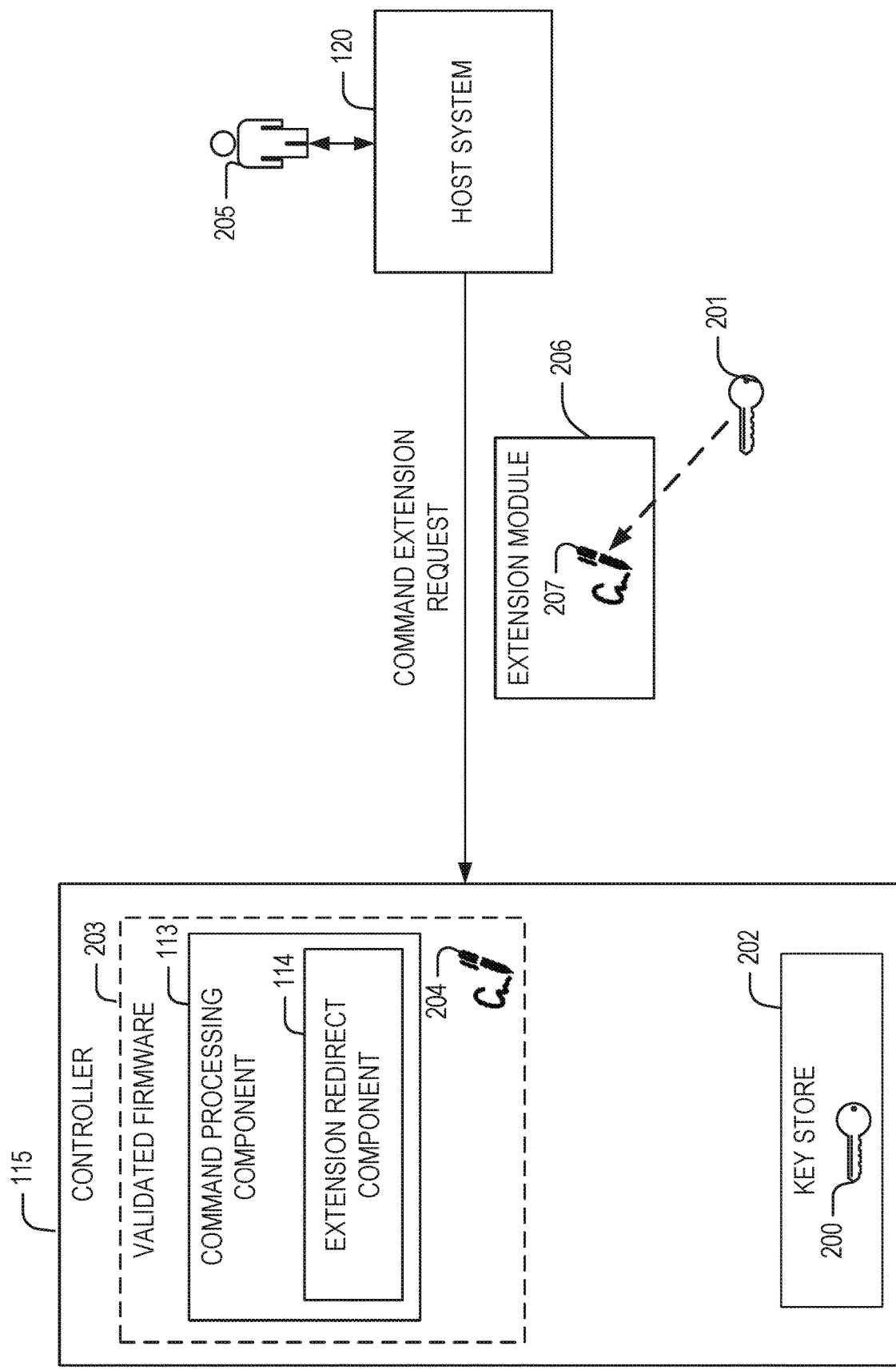
FIGS. 2A-2C are data flow diagrams illustrating interactions between components in a secure communication environment in performing an example method for dynamic extension of memory sub-system commands, in accordance with some embodiments of the present disclosure.
Figure 2B:
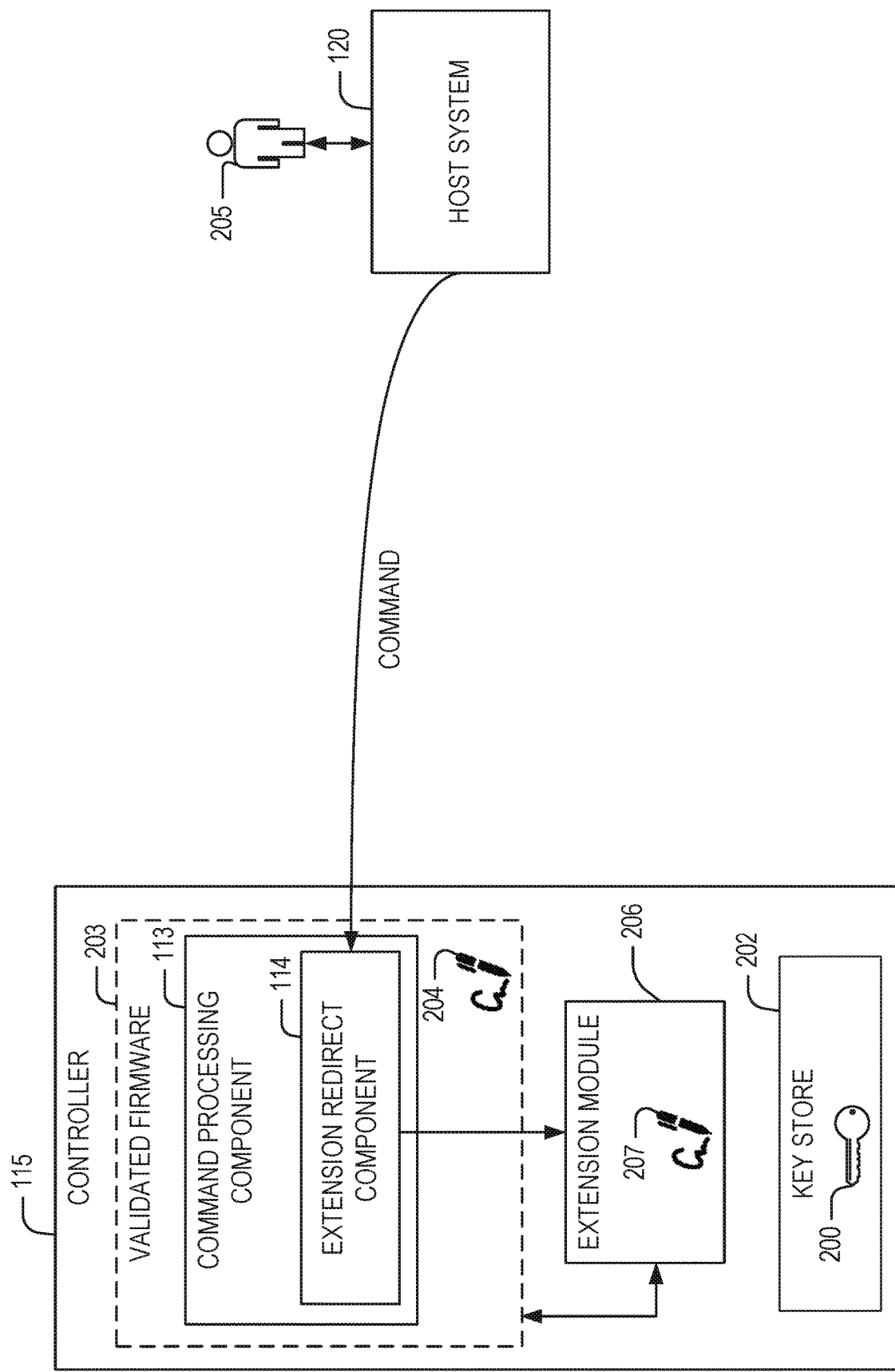
Figure 2C:
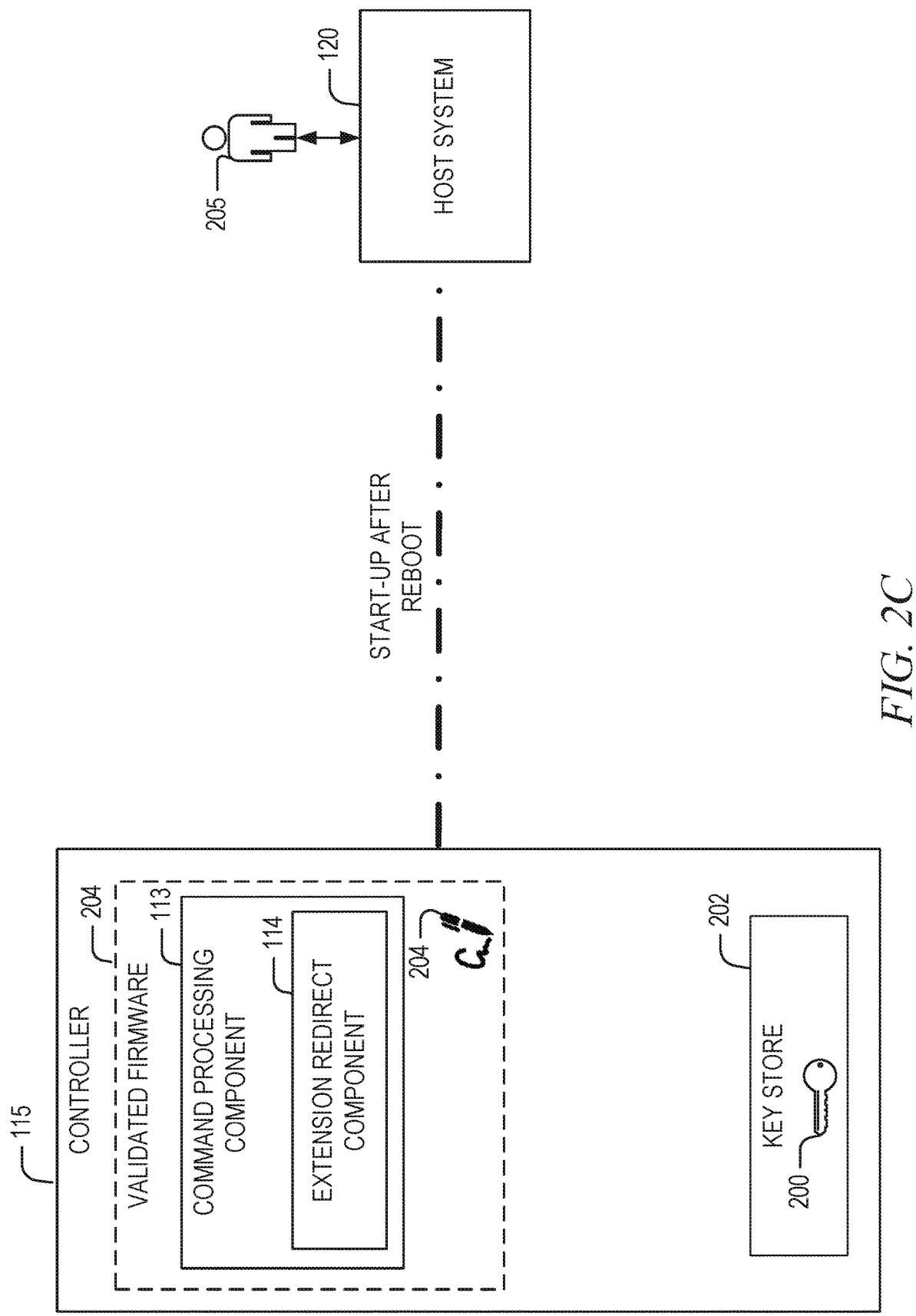

FIGS. 2A-2C are data flow diagrams illustrating interactions between components in a secure communication environment in performing an example method for dynamic extension of memory sub-system commands, in accordance with some embodiments of the present disclosure.

In the context of FIG. 2A-2C, an asymmetric encryption key pair—a public key 200 and a private key 201—are pre-generated, and the command processing component 113 may be provisioned with the public key 200, while the private key 201 is maintained in a separate secure environment (e.g., comprising one or more processors). The command processing component 113 stores the public key 200 in a key store 202. The key store 202 may be implemented within a non-volatile memory device of the controller 115 (e.g., local memory 119) or any one or more of the memory devices 140.

As shown, the command processing component 113 may, in some embodiments, be included as part of validated firmware 203 installed on the controller 115. The firmware 203 includes a set of machine readable instructions that may be executed by the controller 115 to perform a number of functions. For example, the firmware 203 enables the controller 115 to process a set of predefined command types received from the host system 120. As noted above, the host system 120 may submit commands to the controller 115 via the host interface of the controller 115. Commands that correspond to one of the set of predefined command types are processed by the command processing component 113. The firmware 203 is validated in that it has been digitally signed using the private key 201 and the digital signature has been verified by the controller 115 using the public key 200. For example, as shown, a digital signature 204 generated based on the firmware 203 using the private key 201 is provided with the firmware 203 and the controller 115 validates the digital signature 204 using the public key 200.

To extend the capability of the controller 115 to process one or more additional commands, a user 205 of the host system 120 causes the host system 120 to send a command extension request to the controller 115. The command extension request includes a command extension module 206 and a digital signature 207. The command extension module 206 comprises a set of machine-readable instructions that, once installed by the controller 115, enables the controller 115 to process at least one new command type that is not included in the set of predefined command types that the firmware 203 enables the controller 115 to process. The digital signature 207 is generated based on the command extension module 206 using the private key 201. In some embodiments, a security version of the extension module 206 is included in the command extension request. For example, the security version may be specified in a field of the extension module 206 or otherwise in a field of the command extension request.

The command processing component 113 receives the command extension request and verifies the digital signature 207 to ensure that the extension module 206 has been provided by a trusted source. The command processing component 113 uses the public key 200 to verify the digital signature 207. In an example, the digital signature 207 may be generated by creating a first hash based on the extension module 206 and the first hash may be encrypted using the private key 201 to produce the digital signature 207. To verify the digital signature 207, the command processing component 113 generates a second hash based on the received extension module 206 and decrypts the digital signature 207 to produce the first hash. The command processing component 113 compares the first and second hash, and if they match, the digital signature 207 is valid. If the first and second hash do not match, the command processing component 113 determines that the digital signature 207 is not valid and the command extension request is rejected.

As shown in FIG. 2B, the extension module 206 is temporarily installed on the controller 115 based at least in part on the successful validation of the digital signature 207. In this manner, the commands of the controller 115 may be extended beyond the initial capabilities without having to provide the controller 115 with an updated firmware package and without having to verify an updated firmware package, which can be much larger in size that the extension module 206.

In some embodiments, the command processing component 113 may verify a security version of the extension module 206 prior to installation. The security version is used for anti-rollback support (e.g., to prevent a validly signed extension module from being installed on the device). For example, the command processing component 113 may maintain a security version counter to track command extension modules that have been installed on the controller 115 and may verify the security version of the extension module 206 by performing a comparison of the security version with the security version counter. If the security version of a downloaded and verified command extension module is equal to or greater than a stored security version counter value maintained by the command processing component 113 (e.g., in a NVM of the memory sub-system controller 115 such as local memory 119), then the downloaded command extension module can be installed and used. Otherwise, if the security version of the module is less than the stored security version, the command extension module is rejected by the command processing component 113. If the command extension module is accepted, the command processing component 113 updates (e.g., increments) the stored security version value, if the security version of the command extension module is greater than the currently stored value.

In various other embodiments, a TTL value may be used in addition to or in the alternative to the security version counter to control the life time of the command extension module. That is, the command extension module may include a TTL value and once the command extension module is downloaded and verified, the TTL counter begins to count down. Once the TTL counter reaches zero, the command extension module may be erased from device memory and a new extension module will need to be downloaded.

With continued reference to FIG. 2B, the host system 120 may send a command to the controller 115 (e.g., based on input from the user 205). The extension redirect component 114 parses the command and determines that the command corresponds to a command type that the extension module 206 is capable of and responsible for processing. Based on determining the extended command corresponds to the new command type associated with the extension module 206, the extension redirect component 114 redirects the command to the extension module 206 and the extension module 206, in turn, processes the command. In processing the command, the extension module 206 may perform one or more callbacks to the firmware 203 to invoke functionality provided by the firmware 203.

The extension module 206 is temporarily installed on the controller 115 because the extension module 206 is stored on a volatile memory device (e.g., the memory device 130), and thus, the extension module 206 will be erased upon reboot of the memory sub-system 110. For example, as shown in FIG. 2C the extension module 206 is no longer loaded on the controller 115 after a reboot. In another example, the extension module 206 may be erased based on expiration of a TTL value associated with the extension module 206. As noted above, command processing component 113 will be unable to reinstall the extension module 206 because the security version of the extension module 206 will no longer correspond to the security version counter maintained by the command processing component 113.

Figure 3:
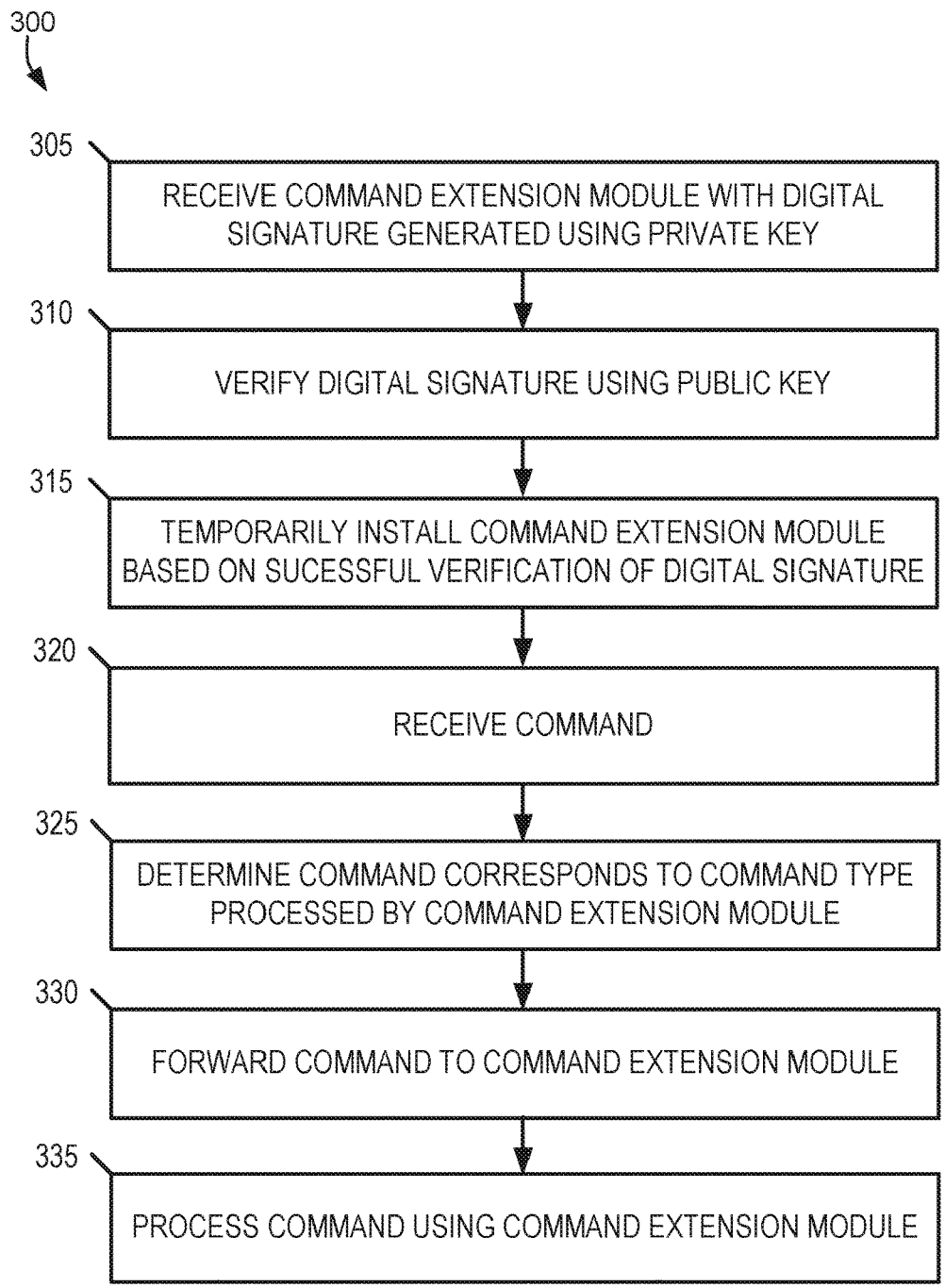
FIGS. 3 and 4 are flow diagrams illustrating an example method for dynamic extension of memory sub-system commands, in accordance with some embodiments of the present disclosure.
Figure 4:
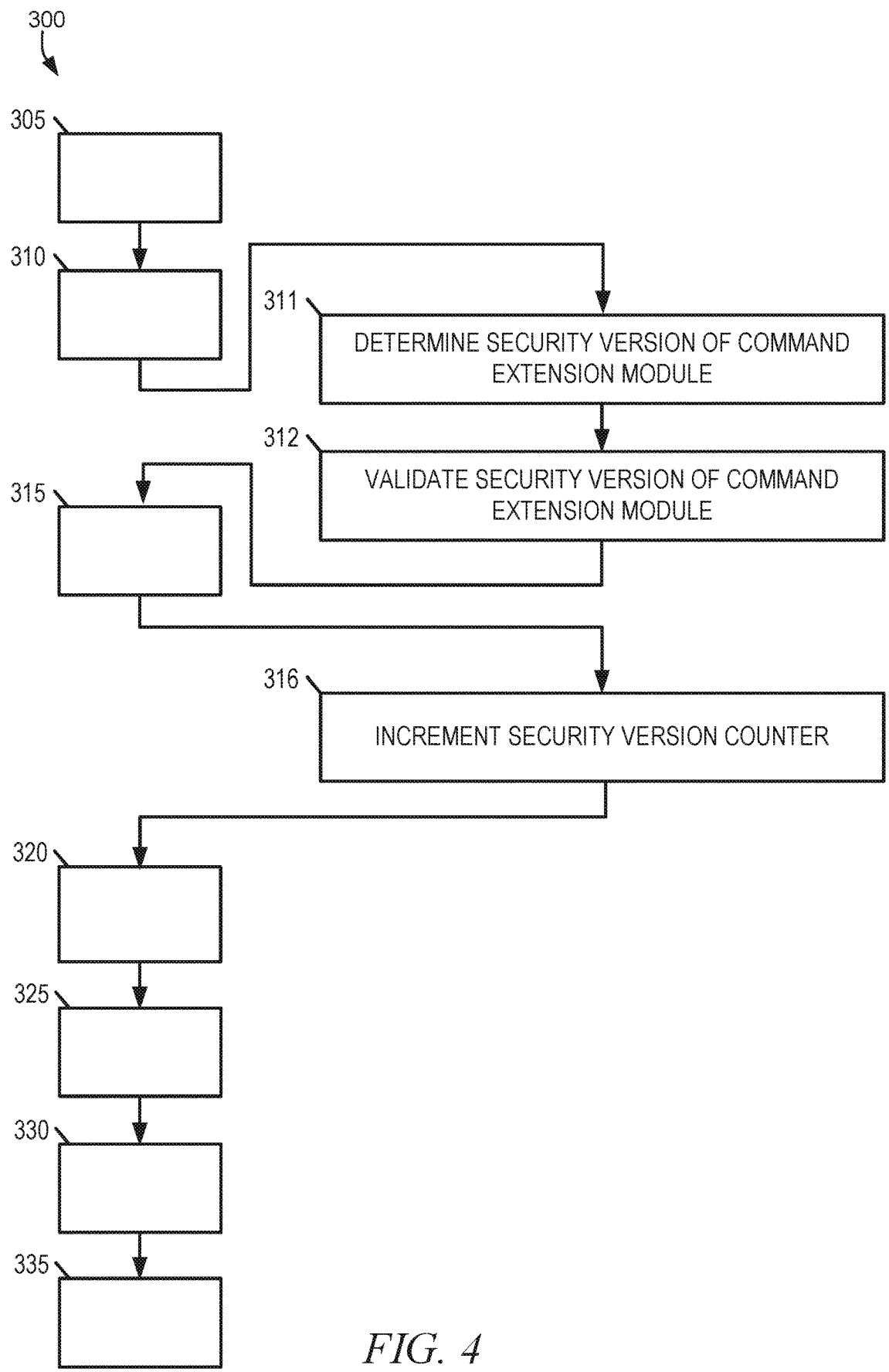

FIGS. 3 AND 4 are flow diagrams illustrating an example method 300 for dynamic extension of memory sub-system commands, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the command processing component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Prior to the method 300, an asymmetric public/private key pair—a public key and a private key—is pre-generated, and the processing device may be provisioned with or otherwise have access to the public key, while the private key is maintained in a separate and distinct secure environment (e.g., operated by an OEM). Further, the processing device includes firmware that enables the processing device to process a predetermined set of command types.

At operation 305, the processing device receives a command extension module and a digital signature as part of a command extension request. The command extension module comprises a set of machine-readable instructions that enables the processing device to process at least one new command type that is not included in the predetermined set of command types that the firmware enables the processing device to process. The digital signature is generated based on the command extension module using the private key. The signing of the command extension module with the cryptographic signature may occur in a remote and secure environment. The digital signature may comprise a asymmetric cryptographic signature generated using a cryptographic algorithm, such as a Rivest Shamir Adleman (RSA) algorithm. The cryptographic signature can be associated with a public key that can be shared with one or more devices, and a private key that can be shared with a limited number of devices. The combination of the public and private keys can be used to verify the integrity of the command extension module using the asymmetric cryptographic algorithm. Consistent with some embodiments, the command extension module may also be encrypted, for example, using a symmetric cryptographic algorithm (e.g., advanced encryption standard (AES)).

The command extension request may be received from the host system 120. In some embodiments, receiving the request includes receiving one or more commands from the host system via a host system interface. In some embodiments, receiving the request includes receiving the request from the host system via a communication port (e.g., a UART port or other serial communication port that supports two-way communication). In some embodiments, an out of band interface can be used for exchanging data between the host system 120 and the processing device (e.g., a system management bus (SMBus) or an Inter-Integrated Circuit (I2C) bus).

The processing device, at operation 310, verifies the digital signature using a public key corresponding to the private key. As noted above, the processing device is previously provisioned with the public key. The public key may be stored in a key store (e.g., key store 202) maintained in a non-volatile memory device (e.g., local memory 119 or the memory device 140). The combination of the public and private keys can be used to verify the digital signature based upon one or more cryptographic procedures. For example, the digital signature may be an asymmetric cryptographic signature that can be verified based upon an asymmetric cryptographic procedure that uses the asymmetric cryptographic algorithm used to generated the signature (e.g., RSA).

In response to a successful validation of the digital signature, the processing device temporarily installs the command extension module, at operation 315. The installing of the command extension module comprises storing the command extension module in a volatile memory device (e.g., the memory device 130). In this manner, the installation of the command extension module is impermanent because the command extension module will be lost on system reboot or expiration of a TTL value.

At operation 320, the processing device receives a command and determines the command corresponds to a command type capable of being processed by the command extension module, at operation 325. The command may be received from the host system 120 via the host interface.

Based on determining the command corresponds to a command type capable of being processed by the command extension module, the processing device forwards the extended command to the command extension module, at operation 330. More specifically, the processing device may comprise an extension redirect component (e.g., extension redirect component 114) that is responsible for redirecting commands to the command extension module that the command extension module is responsible for processing. The extension redirect component may parse the command to determine it corresponds to a command type handled by the command extension module.

The command extension module, at operation 335, processes the extended command. The command extension module may perform one or more actions in processing the extended command. In some instances, the command extension module may perform one or more callbacks to the processing device for support functions needed to process the extended command.

As shown in FIG. 4, the method 300 may, in some embodiments, include operations 311, 312, and 316. Consistent with these embodiments, the operations 311 and 312 may be performed prior to the operation 315, where the processing device temporarily installs the command extension module.

At operation 311, the processing device determines a security version of the command extension module. The security version of the command extension module may, for example, be included in the command extension request in which the command extension module was included.

At operation 312, the processing device validates the security version of the command extension module. The processing device validates the security version of the command extension module based on stored information used to track command extension modules installed by the processing device. For example, the processing device may maintain a security version counter to track which command extension modules have been installed by the processing device. The processing device may compare the security version of the command extension module with the security version counter to determine whether the command extension module was previously installed. If the command extension module was not previously installed, the processing device successfully validates the security version and installs the extension module based on the successful validations. If the command extension module was previously installed, processing device determines the security version is invalid and the processing device rejections the command extension request.

Consistent with these embodiments, the operation 316 may be performed subsequent to operation 315. At operation 316, the processing device increments the security version counter based on installing the command extension module. As noted above, the security version counter is used to track which command extension modules have been installed by the processing device. After updating the security version counter, the command extension module will no longer be able to be installed by the processing device.

In various other embodiments, a TTL value may be used in addition to or in the alternative to the security version counter. That is, the command extension module can specify a TTL value that is used to control the life time of the extension module. Meaning, once the command extension module is downloaded and verified, the TTL counter begins to count down. Once the TTL counter reaches zero, the extension module is purged from device memory and a new extension module will need to be downloaded.

Example 1 is a system comprising: a volatile memory device comprising volatile memory media; and a processing device configured to process an initial set of command types, the processing device, operatively coupled with the volatile memory device, to perform operations comprising: receiving a command extension module and a digital signature, the digital signature being generated based on the command extension module using a private key of a key pair, the command extension module, once installed by the processing device, enabling the processing device to process a new command type that is not included in the initial set of command types; verifying the digital signature using a public key of the key pair; and based on a successful verification of the digital signature, temporarily installing the command extension module on the system, the temporary install of the command extension module comprising loading the command extension module in the volatile memory device.

In Example 2, the subject matter of Example 1 optionally comprises an extension redirect component to: receive a command; determine the command corresponds to the new command type; and forward the command to the command extension module based on the command corresponding to the new command type.

In Example 3, the command extension module of any one or more of Examples 1 or 2 processes the command.

In Example 4, the command extension module of any one or more of Examples 1-3 performs one or more callbacks to the firmware in processing the command.

In Example 5, the command extension module of any one of Examples 1-4 is erased upon a system reboot or expiration of a TTL value.

In Example 6, the operations of any one or more of Examples 1-5 optionally comprise determining a security version of the command extension module; and validating the security version of the command extension module based on stored information.

In Example 7, the operations of any one or more of Examples 1-6 optionally comprise validating a security version of the command extension module by comparing the security version of the command extension module to a security version counter.

In Example 8, the operations of any one or more of Examples 1-7 optionally comprise incrementing the security version counter based on temporarily installing the command extension module.

In Example 9, the subject matter of any one or more of Examples 1-8 optionally comprises a non-volatile memory media to store the public key.

In Example 10, the subject matter of any one or more of Examples 1-9 optionally comprises a host interface, wherein the command extension module and digital signature are received via the host interface as part of a command extension request.

In Example 11, the operations of any one or more of Examples 1-10 optionally comprise: using an asymmetric cryptographic algorithm to verify the digital signature based on a combination of the public and private key.

Example 12 is a method comprising receiving, by a memory sub-system controller comprising one or more processors of a machine, a command extension module and a digital signature, the digital signature being generated based on the command extension module using a private key of a key pair, the memory sub-system controller comprising firmware that enables the memory sub-system to process an initial set of command types, the command extension module comprising a set of machine-readable instructions that, once installed by the memory sub-system controller, enables the memory sub-system controller to process a new command type that is not included in the initial set of command types; verifying, by the memory sub-system controller, the digital signature using a public key of the key pair; and based on a successful verification of the digital signature, temporarily installing, at the memory sub-system controller, the command extension module, the temporary install of the command extension module comprising storing the command extension module in a volatile memory device of the memory sub-system controller.

In Example 13, the subject matter of Example 1 optionally comprises: determining the command corresponds to the new command type; and forwarding the command to the command extension module based on the command corresponding to the new command type.

In Example 14, the subject matter of any one or more of Examples 12 or 13 optionally comprises processing the command using the extension command module.

In Example 15, the command extension module of any one of Examples 12-14 is erased upon a system reboot.

In Example 16, the subject matter of any one or more of Examples 12-15 optionally comprises determining a security version of the command extension module; and validating the security version of the command extension module based on stored information.

In Example 17, the operations of any one or more of Examples 12-16 optionally comprise validating a security version of the command extension module by comparing the security version of the command extension module to a security version counter and incrementing the security version counter based on temporarily installing the command extension module.

In Example 18, the subject matter of any one or more of Examples 12-17 optionally comprises receiving the command extension module and the digital signature, from a host system, via a host interface, as part of a command extension request.

In Example 19, the subject matter of any one or more of Examples 12-18 optionally comprises: using an asymmetric cryptographic algorithm to verify the digital signature based on a combination of the public and private key.

Example 20 is a non-transitory computer-readable storage medium comprising instructions that, when executed by a processing device, configure the processing device to perform operations comprising: receiving a command extension module and a digital signature, the digital signature being generated based on the command extension module using a private key of a key pair, the processing device comprising firmware that enables the processing device to process an initial set of command types, the command extension module comprising a set of machine-readable instructions, that once installed by the processing device, enables the processing device to process a new command type that is not included in the initial set of command types; verifying the digital signature using a public key of the key pair; and, based on a successful verification of the digital signature, temporarily installing the command extension module, the temporary install of the command extension module comprising storing the command extension module in a volatile memory device of the processing device.

Figure 5:
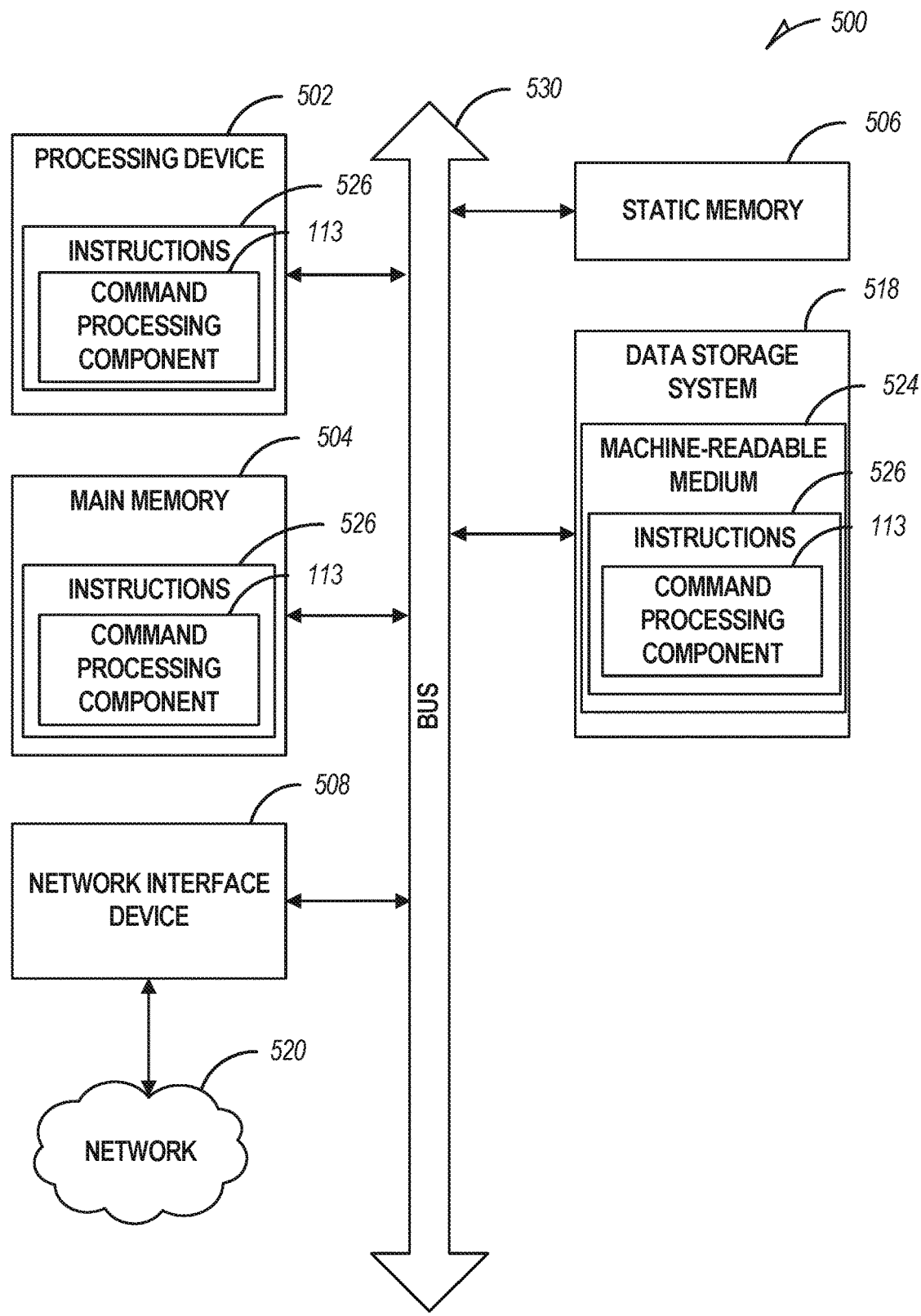
FIG. 5 is a block diagram of an example computer system in which embodiments of the present disclosure may operate.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the command processing component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory. DRAM such as SDRAM or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an ASIC, an FPGA, a digital signal processor (DSP), a network processor, or the like. The processing device 502 is configured to execute instructions 525 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 525 or software embodying any one or more of the methodologies or functions described herein. The instructions 525 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a security component (e.g., the command processing component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks. CD-ROMs, and magnetic-optical disks; ROMs; RAMs; erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., a computer-readable) storage medium such as a ROM, a RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A system comprising:
a volatile memory device; and
a processing device configured to process an initial set of command types, the processing device, operatively coupled with the volatile memory device, configured to perform operations comprising:
receiving a command extension module and a digital signature, the digital signature being generated based on the command extension module using a private key of a key pair, the command extension module, once installed by the processing device, enabling the processing device to process a new command type that is not included in the initial set of command types, the command extension module comprising a time to live (TTL) value;
verifying the digital signature using a public key of the key pair;
based on a successful verification of the digital signature, temporarily installing the command extension module on the system, the temporarily installing of the command extension module comprising loading the command extension module in the volatile memory device;
the processing device comprising an extension redirect component configured to forward a command to the command extension module based on the command corresponding to the new command type; and
the processing device further configured to erase the command extension module based on expiration of the TTL value.

2. The system of claim 1, wherein the extension redirect component is further configured to:
receive the command; and
determine the command corresponds to the new command type.

3. The system of claim 1, wherein the command extension module processes the command.

4. The system of claim 3, wherein the command extension module performs one or more callbacks to the processing device in processing the command.

5. The system of claim 1, wherein the command extension module is erased upon system reboot.

6. The system of claim 1, wherein the operations further comprise:
determining a security version of the command extension module; and
validating the security version of the command extension module based on stored information.

7. The system of claim 6, wherein the validating of the security version of the command extension module comprises comparing the security version of the command extension module to a security version counter.

8. The system of claim 7, wherein the operations further comprise:
incrementing the security version counter based on temporarily installing the command extension module.

9. The system of claim 1, further comprising non-volatile memory media to store the public key.

10. The system of claim 1, further comprising a host interface, wherein the command extension module and digital signature are received via the host interface as part of a command extension request.

11. The system of claim 1, wherein the verifying of the digital signature by the processing device comprises using an asymmetric cryptographic algorithm to verify the digital signature based on a combination of the public and private key.

12. A method comprising:
receiving, by a memory sub-system controller comprising one or more processors of a machine, a command extension module and a digital signature, the digital signature being generated based on the command extension module using a private key of a key pair, the memory sub-system controller comprising firmware that enables the memory sub-system to process an initial set of command types, the command extension module comprising a set of machine-readable instructions, that once installed by the memory sub-system controller, enables the memory sub-system controller to process a new command type that is not included in the initial set of command types, the command extension module comprising a time to live (TTL) value;
verifying, by the memory sub-system controller, the digital signature using a public key of the key pair;

based on a successful verification of the digital signature, temporarily installing, at the memory sub-system controller, the command extension module, the temporarily installing of the command extension module comprising storing the command extension module in a volatile memory device of the memory sub-system controller;

forwarding a command to the command extension module based on the command corresponding to the new command type; and erasing the command extension module based on expiration of the TTL value.

13. The method of claim 12, further comprising:
receiving the command; and
determining the command corresponds to the new command type.

14. The method of claim 12, further comprising:
processing, by the command extension module, the command.

15. The method of claim 12, further comprising:
initiating a TTL countdown upon installing the command extension module; and
detecting the expiration of the TTL value based on the TTL countdown.

16. The method of claim 12, further comprising:
determining a security version of the command extension module; and
validating the security version of the command extension module based on stored information.

17. The method of claim 16, wherein:
the validating of the security version of the command extension module comprises comparing the security version of the command extension module to a security version counter; and
the method further comprises:
incrementing the security version counter based on temporarily installing the command extension module.

18. The method of claim 12, the command extension module and digital signature are received, from a host system, via a host interface of the memory sub-system controller, as part of a command extension request.

19. The method of claim 12, wherein the verifying of the digital signature by the processing device comprises using an asymmetric cryptographic algorithm to verify the digital signature based on a combination of the public and private key.

20. A non-transitory computer-readable storage medium comprising instructions that, when executed by a processing device, configure the processing device to perform operations comprising:

receiving a command extension module and a digital signature, the digital signature being generated based on the command extension module using a private key of a key pair, the processing device comprising firmware that enables the processing device to process an initial set of command types, the command extension module comprising a set of machine-readable instructions, that once installed by the processing device, enables the processing device to process a new command type that is not included in the initial set of command types, the command extension module comprising a time to live (TTL) value;

verifying the digital signature using a public key of the key pair;

based on a successful verification of the digital signature, temporarily installing the command extension module, the temporarily installing of the command extension module comprising storing the command extension module in a volatile memory device of the processing device;

forwarding a command to the command extension module based on the command corresponding to the new command type; and erasing the command extension module based on expiration of the TTL value.

* * * * *